UNITED STATES PATENT OFFICE 2,183,227

OIL PAINT FOR WET SURFACES

Herman A. Scholz, Oak Park, Ill., assignor to United States Gypsum Company, Chicago, Ill., a corporation of Illinois No Drawing. Application June 24, 1936,
Serial No. 86,985

3 Claims. (Cl. 134—39)

This invention relates to paints and the process of making the same.

In order to obtain a uniform dispersion of pigments and fillers in paint vehicles, particularly those of an oleaginous nature used ordinarily in paints, and to obtain a stronger color depth and tone, manufacturers of such products grind the same to a high degree of fineness and impalpability. However, in practice, when oil is added to the finely ground material, a paste is formed which contains a large number of agglomerates comprising undispersed material. These agglomerates, though relatively soft, if allowed to remain undispersed, will cause pigment streaks and loss of efficiency of the tinting power of the pigment in the final product. To overcome this condition, paint manufacturers disperse the finely ground materials in vehicles by means of intensive, prolonged and costly grinding in paint mills.

In practising my invention, I obtain equal if not better dispersion of pigments and fillers in paint vehicles and by a more economical method. Though my invention is directed to oil paints, it is not my intention to limit it to the same, for obviously it can be applied with equal effectiveness to other vehicles, either natural or synthetic, with which it is difficult to wet the surfaces of pigment and filler particles. This invention is particularly suitable for making paints from pigments or fillers which are prepared by wet processes. These pigments and fillers generally, after their formation as precipitates or deposition on carriers, require washing, drying and grinding. Lithopone, titanium dioxide dispersions, blanc fixe, lakes, most so-called dry colors, and other pigments are prepared in this manner. Certain pigments such as Prussian blue, chrome yellows, toners, etc., are affected adversely and lose considerable tinting power during the processes of drying and grinding. I may, however, by my invention evenly disperse, in oil or paint vehicles, wet precipitated materials without the customary and further preparation of the same, as by drying, grinding and screening. Thus I am not only able to effect marked economy in the cost of raw paint materials by utilizing wet pigments and fillers but also to effect further economy by decreasing the amount of pigment necessary, for I obtain better and more uniform dispersion of a more strongly concentrated pigment color unaffected by processing. If the precipitated pigment has been dried and ground, the process of my invention will again disperse it to a condition approaching its original fineness of subdivision. It is not my intention to limit this invention to the use of wet pigments or fillers prepared by the wet processes, for it can be applied with equal effectiveness to other natural or synthetic pigments prepared by other means, such as sublimation, and generally sold in the form of a dry powder.

In painting surfaces, especially of wood, master painters are particularly careful to allow sufficient time for the wood to season thoroughly and for evaporation of the free sap moisture. At times, they may even prime such surfaces with sealers to prevent the integral moisture from coming in contact with freshly painted oil film. Frequently they are delayed and prevented from working by rain or water soaked wood structures. In addition, wood constantly exposed to conditions of high humidity, as found in mines, damp cellars, steaming rooms, laundries and other similar places, will absorb moisture and become damp. Under such conditions it is impossible to paint the wood with conventional oil paints.

It is therefore an object of my invention to provide a process of preparing, in an economical manner, a paint possessing outstanding qualities without intensive and prolonged grinding of the pigment and fillers.

A further object of my invention is to provide a process of producing a better and more uniform dispersion of pigments and fillers within a paint vehicle, and thereby obtain a more effective development of the pigment color tone and depth, at a marked economy in cost and operation.

A still further object of my invention is to provide a process of producing an oil paint whereby wet and freshly precipitated or wet pigments and fillers can be incorporated and dispersed therein uniformly without resorting to intensive, prolonged and costly milling.

An additional object of my invention is to provide a paint product suitable for use not only over dry exterior and interior surfaces but also on damp surfaces exposed to conditions of high humidity, such as in mines.

These and other objects, uses, advantages, and various adaptations of my invention hereinafter specified and claimed, will become immediately apparent to those skilled in the art.

I have found that, when zinc oxide pigments are mixed with water to a heavy paste and allowed to stand until thoroughly wet, I can incorporate therein boiled linseed oil and form an oil-in-water emulsion. However, within a short time, this emulsion reverses itself and forms a water-in-oil emulsion, whereby the oil is in a continuous phase and the water is dispersed therein in microscopic globules. I have found that zinc oxide and other equivalents, hereinafter called reagents, have the property of replacing the water meldium with oil which becomes the active wetting and contacting medium on the surfaces of the pigment and filler particules. I am now able to add directly oil or other vehicle, either natural or synthetic, which may or may not contain, dissolved therein, gums, varnish, resins or other working-property and quality-modifying ingredients well known to the art.

The displaced water does not separate but remains in the form of microscopic, emulsified globules. The water, like any other paint thinner, evaporates when the paint is used, and leaves an oil, bound protective film. Thus I am able to use an inexpensive material as a thinner, to replace the more expensive conventional thinners, and yet obtain equally beneficial results and totally unexpected qualities in my product.

I have found that certain commercial zinc oxides are notably better in their effectiveness as reagents than others. I have also found that the leaded zinc oxides containing approximately five per cent of lead are particularly effective in this respect. Further, I have found that small quantities of commercial "precipitated zinc carbonate", which is supposed to be a mixture or a compound of zinc carbonate and zinc hydroxide, are equally as efficient as larger quantities of zinc oxide, and thus enable me to substitute, wholly or partly, other pigments and fillers, such as lithopone, titanium dioxide dispersions, etc., in place of zinc oxide.

In preparing my paint, I prefer to use the formula and process outlined below, though it is not my intention to limit the same to the quantities or proportions stated therein, for obviously the same can be varied considerably without departing from the spirit of this invention. Neither is it important that the exact materials named herein be used in preparing my paint, for the salient feature of my invention comprises the use of reagents capable of making pigments and fillers used in paints wettable by oil when the said pigments and fillers are wetted by and dispersed in an aqueous medium. It is immaterial whether the aqueous or paint vehicle mediums used in preparing my paint contain dissolved therein other ingredients, provided however that the same do not affect adversely the action of the reagents.

As a typical formula of my improved paint the following is given:

| | | |
|---|---|---|
| Pigment | pounds | 100 to 200 |
| Fillers | do | 20 to 100 |
| Emulsifying reagent | do | ½ to 20 |
| Water | gallons | 6 to 12 |
| Vehicle | do | 10 to 14 |
| Drier (if required) | do | ⅜ |
| Thinner | do | 0 to 4 |

In preparing the paint, the dry materials, with or without premixing, are added to the water contained in a suitable mixer, such as a rotary can mixer. If wet materials are used, a proportionately smaller amount of water is required. The materials are allowed to become thoroughly wet and form a thick water paste. I add gradually the oil or other vehicle, containing the drier if necessary to this paste and incorporate it therewith by stirring. Then I finally add the thinner, if required. After a thorough blending, the product is ready for packaging and shipment. The percentage by weight of water in the finished paint may vary from 20% to 40%. It should be particularly noted that no grinding or milling of the paste is required to obtain a smooth, uniformly dispersed and pigmented paint. However, I do not wish to limit myself to preparing my product in this manner, since obviously it can also be prepared in the conventional paint grinding equipment.

I may use pigments having high refractive indices, such as lithopone, zinc sulfide, titanium dioxide, iron oxides, lead chromates, zinc oxide, either lead-free or leaded, and other well known materials. For fillers I may use materials of low refractive indices such as barytes, silica, mica, talc and others. All of these materials can be used in such quantities as may be deemed advisable in formulating and in view of the properties desired in the final product. As a thinner, I may use oleum spirits, turpentine, rosin spirits, benzine, etc.

I have found that the best reagent is commercial "precipitated zinc carbonate", which it is believed is a mixture or compound of zinc carbonate and zinc hydroxide. As equivalents I have found that zinc compounds substantially insoluble in water, such as leaded or lead-free zinc oxide, zinc carbonate, and zinc hydroxide are also effective, either alone or in various combinations thereof. I may use as little of the reagent as 0.1 of 1%, and as high as 20%, or even use it entirely to serve as a combined pigment and reagent.

The paint vehicle may consist of boiled, raw, or treated linseed, China-wood, hempseed, soybean, or fish oils, or any combination thereof, with or without varnish or synthetic resins, plasticizers, or other property or quality modifying ingredients. For convenience, I incorporate in the vehicle, driers such as cobalt, lead or manganese resinates, lineoleates, tungates, naphthenates and others, though the same may be added directly to the water paste before or after the addition of the vehicle. In fact, I may use almost any vehicle used in oil paints, varnishes and enamels.

My improved paint dries with a full oil gloss which I may, by addition of flatting oils or well known ingredients, lessen to any desired degree. It is easy to manufacture and compares favorably with conventional paints in appearance, hiding and covering properties and durability, and has superior application qualities. The paint film fails by chalking, which is a highly desirable quality in paint, since the surface is always clean and fresh appearing. Furthermore, subsequent painting does not tend to build up heavy, thick coats of paint which are subject to checking and cracking. It is the only paint known to me that gives satisfactory results on wet woodwork, as in mines.

Another application of this invention is in the manufacture of paste colors in oil, natural or synthetic. Precipitated pigments, such as chrome yellows, greens, various lakes, etc., can be utilized in the finely divided wet or dry state.

I may mix the dry ingredients in the factory and forward the same to the job, place where they are to be applied and where the water and oil may be incorporated therewith in accordance with my invention. I am thus able to effect a further saving since no forwarding charges are paid on paint liquids which often can be obtained just as economically locally. However, it may be desirable at times to ship the material in the liquid paint form to meet local market conditions.

The salient feature of my invention consists in the use of finely divided zinc compounds insoluble in water, such as zinc oxide, zinc hydroxide, zinc carbonate or commercial "precipitated zinc carbonate", to render pigments and fillers which are ordinarily used in paints, wettable with oils when they are dispersed in water. Other suitable emulsifying agents may be used. Thus the unexpected result is accomplished in making the oil and water change places without at the same time causing the water to separate from the mixture, the finished paint being a homogeneous emulsion of solid matter, oil and water, with the water in the discontinuous phase. In the claims to follow, it should be understood that when a group of agents is listed, one or more of the agents of the group may be used as a mixture and still come within the contemplated scope of the claims.

I would state in conclusion that while the illustrated examples constitute practical embodiments of my invention, I do not wish to limit myself specifically to these details, since manifestly the same can be varied considerably without departing from the spirit of the invention as defined in the attached claims.

Having described my invention, I claim as new and desire to secure by Letters Patent:

1. The process of preparing a paint suitable for application to wet surfaces, comprising mixing, without grinding, water with a pigment and a substantially water-insoluble zinc compound from the group consisting of zinc oxide, leaded zinc oxide, zinc hydroxide, zinc carbonate and precipitated zinc carbonate, permitting said mixture to stand until the solids are thoroughly wet by the water, and mixing a drying oil with the resulting paste to form a stable water-in-oil emulsion.

2. The process of preparing a water-in-oil emulsion, comprising mixing, without grinding, water with a substantially water-insoluble zinc compound from the group consisting of zinc oxide, leaded zinc oxide, zinc hydroxide, zinc carbonate and precipitated zinc carbonate, and, after standing a short period, mixing with the resulting paste an oleaginous liquid from the group consisting of linseed, China-wood, hempseed, soybean and fish oils to form a permanent water in oil emulsion.

3. A water-in-oil stable homogeneous paint emulsion containing a minor amount of water, a major amount of drying oil relative to the amount of water, a pigment, and a water-insoluble zinc compound selected from the group consisting of zinc oxide, leaded zinc oxide, zinc hydroxide, zinc carbonate and precipitated zinc carbonate in an amount to maintain the ingredients of the paint in stable condition.

HERMAN A. SCHOLZ.